United States Patent
Xie

(10) Patent No.: US 6,889,412 B2
(45) Date of Patent: May 10, 2005

(54) METHOD FOR PRODUCING EYEWEAR FRAME SUPPORT ARMS WITHOUT WELDING

(76) Inventor: Yiling Xie, 1009 Arcadia Ave., #3, Arcadia, CA (US) 91007

( * ) Notice: Subject to any disclaimer, the term of this patent is extended or adjusted under 35 U.S.C. 154(b) by 41 days.

(21) Appl. No.: 10/639,983

(22) Filed: Aug. 12, 2003

(65) Prior Publication Data

US 2005/0034287 A1 Feb. 17, 2005

(51) Int. Cl.[7] .............................................. B21D 33/00
(52) U.S. Cl. ............................. 29/20; 351/41; 351/110; 351/124
(58) Field of Search .......................... 351/41, 110, 124; 29/20

(56) References Cited

U.S. PATENT DOCUMENTS 6,682,192 B2 * 1/2004 Conner ....................... 351/110

* cited by examiner

*Primary Examiner*—Hung Xuan Dang
(74) *Attorney, Agent, or Firm*—Jen-Feng Lee

(57) ABSTRACT

A new method of producing central bridge and support arms for spectacles where no welding is required, and no screws were needed to secure lenses to frame. Protruding members on end portion of central bridge are formed, together with the bridge itself, when cut out by a wire-cutting means. Fitting lenses to spectacle frame requires pressing capping pieces into the protruding members having ratchet-like teeth to receive and secure the lenses in place. Durability of spectacle frames is enhanced as a result of no temperature change to the elasticity of the frame material.

4 Claims, 3 Drawing Sheets

METHOD FOR PRODUCING EYEWEAR FRAME SUPPORT ARMS WITHOUT WELDING

FIELD OF THE INVENTION

The present invention relates generally to a production method for eyewear frames, especially for the spectacles where the lenses are not enclosed by portion of the spectacles frame, but rather are fitted directly to the central bridge and the side arms of the frame.

BACKGROUND AND PRIOR ART

Frameless spectacles have been in the market for some years. This type of spectacles boasts the desired characteristics of lightweight due to the fact that there is no encircling material around the lenses. Lenses, therefore, are bolted to the spectacles frame by screws through the pre-drilled holes on the lenses. Present invention will refer to such frameless spectacles as "direct bolting" spectacles, to avoid the confusion caused by the term frame, which is used pervasively in this application.

The typical embodiment of such lightweight spectacles consists of bolting the two lenses to the central bridge, which has a pair of nosepad arms welded to the central bridge. On the outer side of the lenses, side arms (going through temple area and resting on top of human ears) are bolted to the lenses, also using screws.

To ensure and enhance the desired attribute of lightweightness, latest generations of direct bolting spectacles use lightweight alloys containing, for example, titanium and other metals for the frame material. To add the nosepad support arms to the central bridge, however, welding is needed to join the nosepad support arms to the central bridge.

Distance between welding points on the direct bolting spectacles, for welding the nospad arms to the central bridge of spectacles frame and for welding other components such as screw, described later, is often times as small as 2 to 3 mm (millimeters). Such limited room for welding caused a higher rejection rate off the production line by QC (Quality Control), and therefore increased costs of production, due to failure to meet the precision requirement in welding. The increase costs of production in the industry no doubt will be reflected in the products sold into the stream of commerce.

Due to the resulting high temperature needed for achieving effective welding, some variation of the elasticity of the alloy material consisting the frame will occur and adversely affect the durability of the frame.

The use of titanium alloy further exacerbates the welding defects because titanium is inherently harder to weld than traditional carbon-steel alloy, or copper-zinc alloy, or the mixture thereto.

Another problem the direct bolting spectacles has is the use of screws to fit lenses to the frame. Proper amount of torque must be applied to the screws when fitting the lenses to the frame. Too tight, the lenses will be under constant stress and have higher tendency to break. Too lose, the lenses are not properly secured to the frame and the spectacles might fall apart unexpectedly; and further that the focus of the lenses might be different from the predetermined positions by optometrist or ophthalmologist, causing straining injury to the eyes.

Besides the issue of imprecision torque to the screws when fitting lenses to the frame, the welding of the tiny screws onto frame is itself another industry problem. These tiny screws present the same type of precision welding challenges to the production facility.

In addition to welding defects that are found at the production line, latent welding defects (both on the nosepad arms and on the welded screws) do not manifest themselves until the spectacle frames, already passed QC, get used for some time and then consumers start to feel something wrong with the frame. This type of latent defects further result in increase costs of consumer service, product return and even product reliability on the market.

SUMMARY AND OBJECT OF THE INVENTION

Present invention consists of two main points to overcome the industry problems described earlier. First, the central bridge connecting two lenses needs no welding. The nosepad arms are not welded to the central bridge; rather, they are formed at the same time as the central bridge when cut out from the metal plate work piece. This is done by wire-cutting out from a work piece to form a first flat-shaped central bridge having nosepad arms.

Without welding involved, the inherent alloy elasticity will not have variation caused by the heat of the welding. There is no more production-rejection due to welding defects. And there is no more latent welding defect in later stage of the product life cycle. The Overall cost of production, therefore, is greatly reduced.

After the central bridge with nosepad arms is cut out, subjected to a sanding means, then the central bridge is subjected to a moulding means to make it into a three-dimensional shape ready to be fitted with lenses. The three-dimensional shape of the central bridge essentially is achieved by moulding the nosepad arms "downward", in the traditional sense, to make them suitable for installing nosepads. The exact shape to be moulded is set by the operator of the moulding means.

Second, protruding members with ratchet-like teeth are used at end portion of central bridge so that when fitting lenses to the frame envisioned by present invention, capping pieces with hollowed-out holes are simply pressed against the lenses and towards the base of such protruding members. Mechanically, the capping piece works like the pawl secured to the teeth on a ratchet gear. No screws were welded to the extending arms of central bridge or the side arms. The welding defects for the use of screws are similarly cured.

Depending on the implementation, protruding members may have several layers of teeth on them so that capping pieces may be pushed towards the base to tighten the lenses; when, after a while, if the lenses start to get loose, capping pieces may be pushed further in, to tighten again. Capping pieces are made of plastic material with limited flexibility.

Alternatively, to tighten the lenses if they get loose, consumers can opt to crumple the capping pieces and insert new capping pieces. Household tools such as pliers can easily allow such crumpling of capping pieces.

The same wire-cutting production method is used to produce the ratchet-like teeth on protruding members of the side arms (specifically, the L-segment portion of the side arms) so that there is no need to weld tiny screws (as the protruding members) on the side arms.

BRIEF DESCRIPTION OF THE DRAWINGS

The accompanying drawings, which are incorporated in and constitute a part of this specification, illustrate the preferred embodiment of the invention and together with the description, serve to explain the principles of the invention. A brief description of the drawings is as follows.

DETAILED DESCRIPTION OF THE PREFERRED EMBODIMENT

Figure 1:
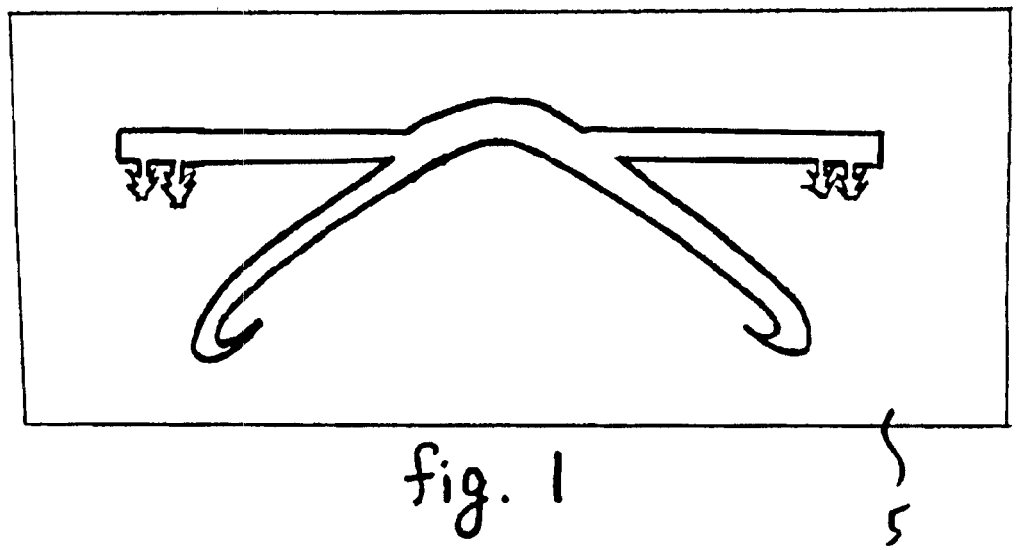
FIG. 1 shows the central bridge to be wire-cut from a metal plate work piece. The teeth on the protruding members are shown.
Figure 2:
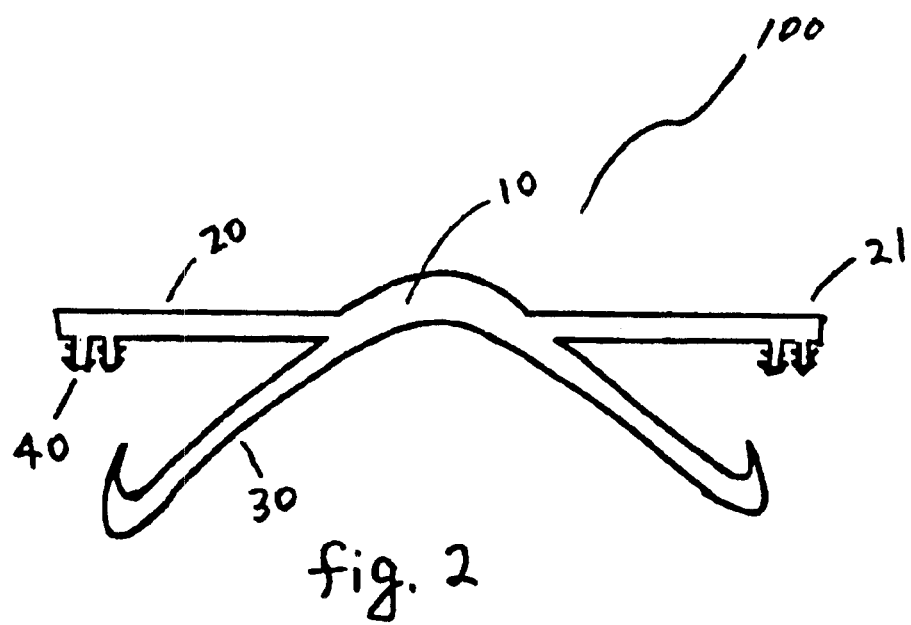
FIG. 2 shows the central bridge, already cut out from the work piece. The end portion of the nosepad arms are bent around in opposition direction to those in FIG. 1.

In FIG. 1 and FIG. 2, a central bridge 100 is cut from a metal plate 5. At end portion 21 of two extending arms 20, protruding members 40 are cut to shape. Two nosepad arms 30 are also cut into shape. An overlapping ridge 10 of the central bridge is shown in FIGS. 1 and 2, by joining the mid-portion of the extending arms 20 and the mid portion of the nospad arms 30.

The end portion of the nosepad arms 30 can be cut to bend around inwards, as in FIG. 1, or outwards, as in FIG. 2.

Precision wire-cutting NC machines are employed to cut the work piece into the shape in FIG. 1 or FIG. 2. Protruding members 40 will be cut to form a plurality of teeth 41 pointing generally towards the base of protruding members 40.

After a first shape of central bridge 100 in FIG. 1 or FIG. 2 is wire-cut from the work, protective materials, such as plastic caps, are used to wrap up the protruding members 40, and the central bridge 100 is then subjected to a sanding means to smooth out the central bridge 100. The reason of wrapping up protruding members 40 is to avoid dulling the teeth 41, so that when fitting central bridge 100 to lenses 60, the teeth 41 will have the sharpness needed to grab on/hook on to the material of capping pieces 64.

Figure 6:
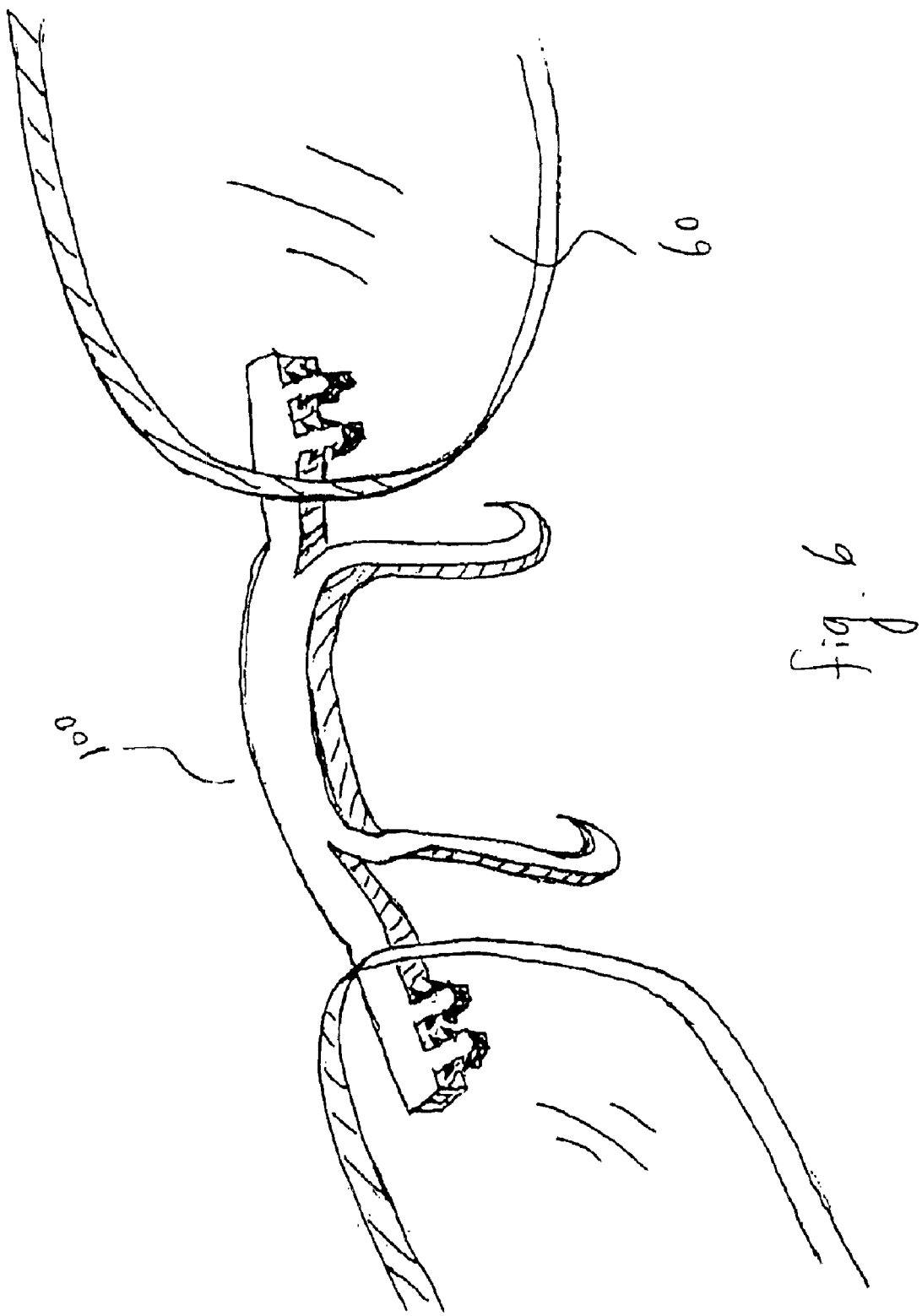
FIG. 6 shows a finished central bridge of present invention fitted to two lenses. The capping pieces on the two lenses are not shown.

After exiting out the sanding means, central bridge 100, still in its original two-dimensional shape, is then subjected to a moulding means to mould it into a three-dimensional shape, ready for fitting lenses 60 by the method described below. One example of the three-dimensional shape is as shown in FIG. 6.

Depending on particular implementation of manufacturing process, the end of nosepad arms 30 can be bent around inwardly or outwardly.

Figure 3:
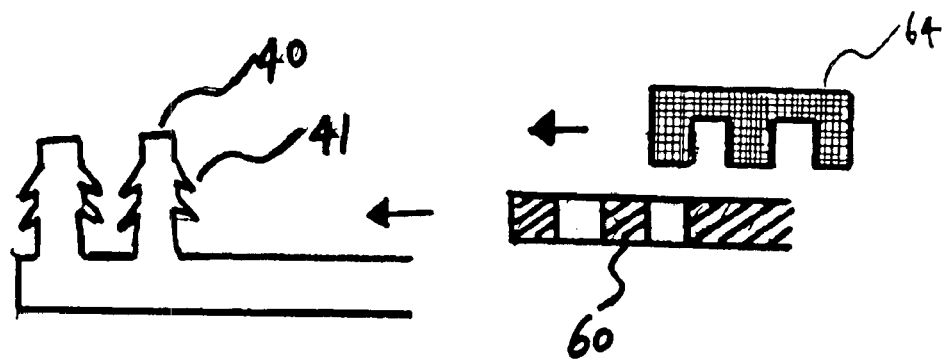
FIG. 3 shows enlarged view of protruding members, one lens with two corresponding holes, and a capping piece with two hollowed-out holes.
Figure 5:
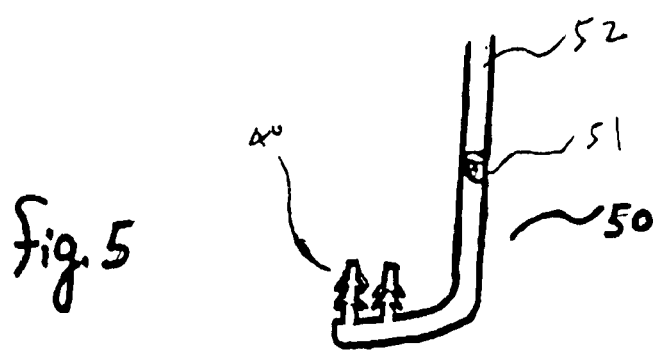
FIG. 5 shows one end of one side arm to a spectacle frame. Two protruding members with ratchet teeth are shown. The L-shaped segment of the side arm is similarly produced by wire-cutting from a metal plate work piece.

FIG. 3 shows two protruding members 40, with ratchet-like teeth 41. The protruding members 40 with teeth 41 appear both on end portion 21 of extending arms 20 and on the L-shaped segment 50 of the side arm 52, as shown in FIG. 5.

FIG. 3 also shows a lens 60 (side profile view) with two pre-drilled holes, to be fitted over the protruding members 40. A capping piece 64 with two hollowed-out holes is shown to be fitted and pressed against the lens 60 and against the base of protruding member 40.

Fitting lenses 60 to a lightweight spectacles frame of present invention will involve simply pressing the capping piece 64 into and towards the base of the protruding members 40. No screws, nor screw drivers, are needed.

Figure 4:
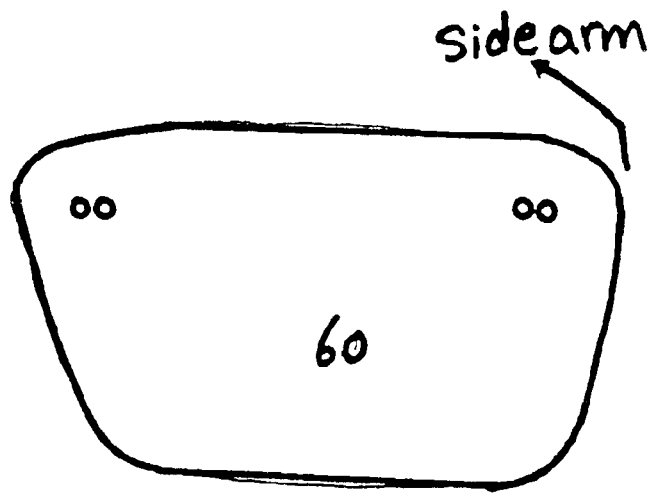
FIG. 4 shows a lens to be fitted to central bridge and side arm of a spectacle frame. Two holes are shown on each end of the lens.

FIG. 4 shows a lens 60 with two pre-drilled holes on both sides: two holes on one side will be used by the protruding members 40 of the extending arms 20; two holes on the other side will be used by the protruding members 40 of the L-shaped segment 50 of the side arm 52.

FIG. 5 shows the lens 60 can be fitted to the side arm 52 with two protruding members 40 on the L-shaped segment 50 wire-cut out from a work piece. The L-shaped segment 50 is produced, sanded, and moulded if necessary, by the same process the central bridge 100 is wire-cut, sanded and moulded. Before sanding, the protruding members 40 on L-shaped segment 50 are similarly wrapped up in protective materials such a plastic caps.

After sanding/moulding, L-shaped segment 50 is then joined by a hinge means 51 to side arm 52.

FIG. 6 shows a finished central bridge 100 made pursuant to present invention fitted to lenses 60. For clarity, the two holes on each of lenses 60 are not shown in the figure. Similarly, the capping pieces 64 over each of the lenses 60 are not shown, for clarity reason.

What is claimed is:

1. A method of producing central bridge of a spectacle frame without welding, comprising:

Step 1: Wire-cutting out from a thin metal work piece to form a first shape having A first beam having extending arms with protruding members on both ends, A second beam having tow nosepad arms on both ends that symmetrically point toward the same direction away from said first bean, An overlapping ridge joined by said mid-sections of said first and second beams;

Step 2: Wrapping up said protruding members by in protective material so that the protruding members will not be subjected to grinding force in later smoothing stage;

Step 3: Smoothing out said first shape by subjecting said first shape to a sanding means;

Step 4: Remove the thin protective material and start bending said first shape by subjecting said first shape to a moulding means, so that a second shape is formed after exiting out the moulding means and is in a state ready to be fitted to lenses, serving as the central bridge connecting the two lenses on a spectacle frame.

2. The production method of claim 1, wherein the outer ends of said nosepad arms on the first shape are bent around for affixing nose pads.

3. The production method of claim 1, wherein each protruding member on said extending arms is wire-cut to form ratchet-like teeth pointing generally to the base of said protruding member to allow the receipt of capping piece by pressing capping piece towards the base of said protruding member.

4. A method of producing L-segment portion having protruding members on the side arm of a spectacle without welding, comprising:

Step 1: Wire-cutting out from a thin metal work piece to form a L-segment containing 2 protruding members further having ratchet-like teeth pointing generally to the base of said protruding member;

Step 2: Wrapping up said protruding members by thin protective material so that the protruding members will not be subjected to grinding force in later smoothing stage;

Step 3: Smoothing out said L-segment piece by subjecting it to a sanding means;

Step 4: Removing the thin protective material from said L-segment piece for any drilling, bending or other desired processing.

* * * * *